Figure 1:
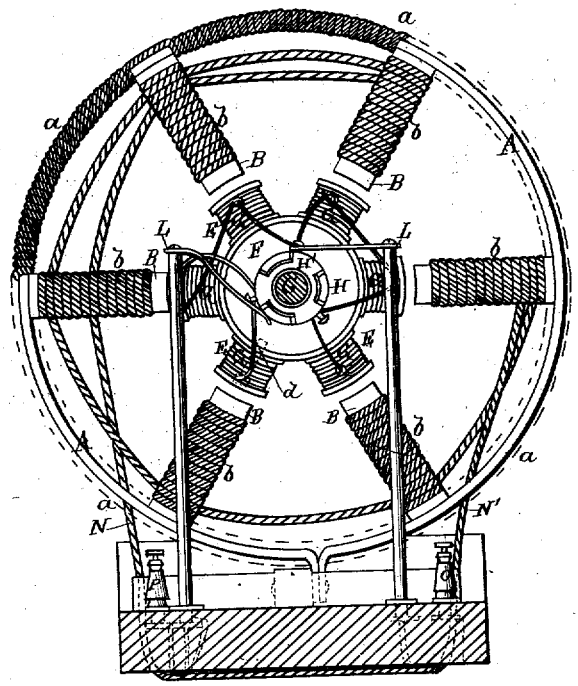

E. WESTON.

Assignor of one half interest to ROBERTS & HAVELL.

Dynamo Electric Machine.

No. 8,141. Reissued March 26, 1878.

WITNESSES

Henry N. Miller

Frank Galt

INVENTOR

Edward Weston

Alexander Mason

ATTORNEYS

THE NORRIS PETERS CO., PHOTO-LITHO., WASHINGTON, D. C.

E. WESTON.

Assignor of one half interest to ROBERTS & HAVELL.

Dynamo Electric Machine.

No. 8,141. Reissued March 26, 1878.

WITNESSES

Henry N. Miller

Frank Galt

INVENTOR

Edward Weston

Alexander Thomson

ATTORNEYS

THE NORRIS PETERS CO., PHOTO-LITHO., WASHINGTON, D. C.

UNITED STATES PATENT OFFICE.

EDWARD WESTON, OF NEWARK, NEW JERSEY, ASSIGNOR OF ONE-HALF INTEREST TO ROBERTS & HAVELL, OF SAME PLACE.

IMPROVEMENT IN DYNAMO-ELECTRIC MACHINES.

Specification forming part of Letters Patent No. 180,082, dated July 18, 1876; Reissue No. 8,141, dated March 26, 1878; application filed July 10, 1877.

*To all whom it may concern:*

Be it known that I, EDWARD WESTON, of Newark, New Jersey, have invented certain Improvements in Dynamo-Electric Machines, of which the following is a specification:

My invention, which embraces a variety of organic improvements in the construction of dynamo-electric machines, the object of which is to enable such machines to transmute mechanical energy into electrical energy with greater economy than heretofore, is based upon the well-known principle of the mutual excitation of a stationary magnet and a revolving armature, with which the stationary magnet is in circuit. This principle has heretofore only been practically applied in machines containing but one electro-magnet, or in machines containing a number of electro-magnets, but in which a portion of the current was exclusively employed to excite the electro-magnets, and the remainder of the current only was available for effective work.

My machine contains a group of revolving armatures and a group of stationary magnets; but the entire current generated in the armatures is passed through the coils of the stationary magnets, as well as through the operative circuit, all the coils upon the electro-magnets being in the same circuit.

The distinguishing characteristic of the organization of my machine is that the revolving armatures and stationary electro-magnets are arranged in the same plane, the stationary magnets being affixed to and projecting convergently from the interior of a hollow cylindrical iron shell, hereinafter called the "cylinder," and the revolving magnets composing the armatures being affixed to and projecting radially outward from a shaft revolving in the center or axis of the cylinder. By this mode of arrangement, and by making my armature-cores long and suitably narrow, and applying them lengthwise to the shaft, I am enabled to diminish their radial projection, and thus greatly reduce the power required to rotate them in the magnetic field.

One feature of my invention is also embodied in my commutator, the parts of which are so halved together that only two brushes are required to collect the pulsating currents from all the armatures in the machine.

My invention also includes the feature of detachable top plates or caps for the armatures, which, by their capacity for detachment, afford opportunity for the bodily removal of the coils from the cores, and, of course, a like opportunity for the application to the cores of coils already wound.

Figure 6:
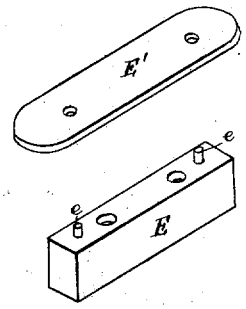
Figure 5:
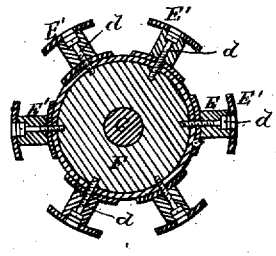
Figure 2:
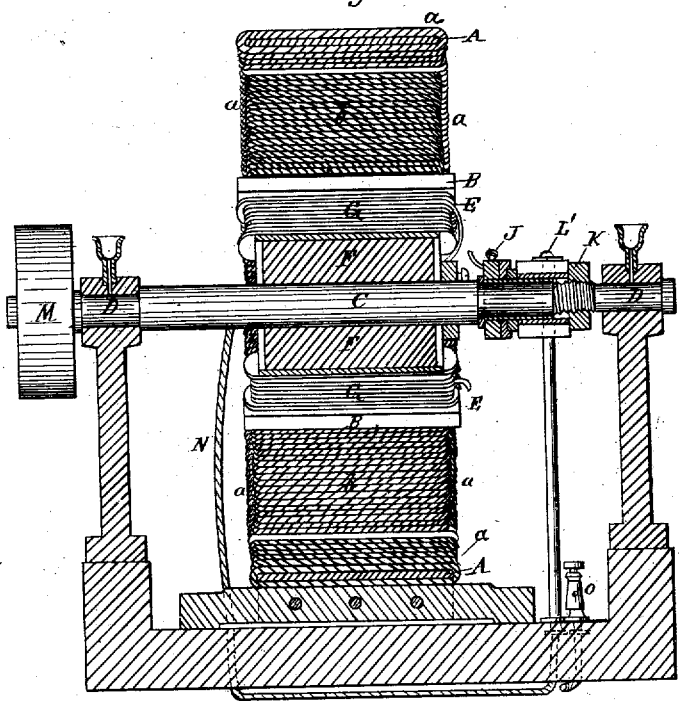
Figure 4:
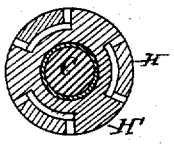
Figure 3:
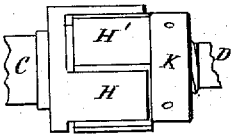

The accompanying drawings are as follows: Figure 1 is an end view of my machine. Fig. 2 is a central longitudinal vertical section. Fig. 3 is a side view of the commutator. Fig. 4 is a transverse section of the commutator. Fig. 5 is a section through one of the electro-magnets composing the revolving armature, and Fig. 6 is a detailed view of the same.

My machine consists of a cylinder, A, which is properly supported upon the bed-plate, and is provided with a number of inwardly-converging electro-magnets, B B. These magnets, which partake of the shape of the armature-magnets in respect of being short radially and elongated transversely in a direction parallel with the shaft C, are each wrapped or wound with metallic wires or ribbons *b b*, in the usual manner.

The cylinder A may also have the wire wrapping *a a*, which will increase the effectiveness of the apparatus by adding to its power.

In the center of the cylinder is the shaft C, mounted in suitable bearings D D, for rotating the armatures E E, which are radially attached to the iron hub F.

The armature-cores are of iron, and are wrapped with the metallic wires or ribbons G G. Each armature is separately affixed to the hub by one or more screws, *d*, or by other suitable means, so that it may be independently attached to or detached from the hub.

Each armature is also provided with a cap or top plate, E′, which, if desired, may be detachably connected to the armature by the pins *e*, or by other suitable means.

The outer ends of the armature-cores, in revolving, just clear the inner ends of the magnets B B.

By the rotation of the shaft C currents of electricity are induced in the armature-coils alternately in opposite directions as the armatures sweep by the successive poles of the stationary magnets. The currents induced in the armatures are collected and conducted to the operative circuit, which includes the coils surrounding all the stationary electro-magnets by means of a metallic commutator composed of two parts, H and H′, insulated from each other, one of which, H′, is electrically connected with the shaft, and is thereby connected with one end of each of the armature-coils, while the other part, H, which is insulated from the shaft, is connected with the other end of each of the armature-coils. One part, H, of the commutator consists of a perforated hub mounted upon an insulated bushing upon the shaft C, and provided with a number of laterally-projecting equidistant strips, the outer surfaces of which coincide with the periphery of the hub. The other part, H′, consists of a smaller hub, mounted directly upon the shaft C, and provided with a group of equidistant radially-projecting strips, the outer faces of which are curved, and also coincide with the periphery of the hub of the piece H.

It will thus be seen that when the two parts of the commutator are brought together the strips with which they are severally provided are equidistantly interplaced in the periphery of the same cylinder.

The two parts of the commutator are clamped in position upon the shaft, between the collar J and the nut K, which is screwed on the outer end of the shaft, and bears against the end of the piece H′. An insulating-collar separates the piece H′ from the piece H, and a flanged bushing of insulating material separates the collar J from the shaft C.

The number of strips in the commutator corresponds to the number of revolving armatures. It is a result of this organization of the commutator that only two springs or brushes, L and L′, are required for the collection of the currents from all the revolving armatures. The brushes L and L′ bear respectively upon strips belonging to different parts of the commutator.

The change in the direction of the current induced in the armatures effects a corresponding change in the polarities in the respective parts of the commutator; but at the instant of this change the rotation of the commutator brings into contact with the respective brushes strips respectively of the same polarities as those of the preceding strips before the change.

Heretofore it has been customary to have as many brushes for the collection of the currents from the commutator as there were strips employed.

As the brushes are an expensive and destructible part of the apparatus, there is an obvious advantage in my invention, in respect of its lessening the number of brushes required.

One of the distinctive characteristics of my machine is that, although it contains a plurality of electro-magnets, both stationary and revolving, it has but a single circuit.

When the shaft C is rotated, which is effected by a driving-belt upon the pulley M, the currents of electricity induced in the armatures are conducted from one of the brush-standards, L′, by means of the wire N to the continuous coils *b* surrounding the electro-magnets B, and also, if desired, to the coils *a a* surrounding the cylinder, and thence, by means of the wire N′, to one of the binding-posts O, to which one end of the operative circuit is connected. The other end of the operative circuit is secured to the other binding-post, P, which is connected with the standard of the other brush, L.

It will thus be seen that by my invention the entire current induced in the coils of the revolving armatures is conducted through the coils surrounding all the stationary magnets, all the coils being incorporated in a single electric circuit, and none of the armatures being set apart merely for the purpose of generating a current whose sole duty it shall be to excite the stationary magnets.

I am aware that in machines in which permanent magnets have been employed in conjunction with electro-magnets, the coils of the electro-magnets have been incorporated in a single circuit. Such machines have been called "magneto-electric machines." I employ electro-magnets only in my machine, and therefore designate it a "dynamo-electric machine."

I claim as my invention—

1. A ring or hollow cylinder of iron or other magnetic material, wrapped or unwrapped, having affixed to its inner side a group of radially-converging magnets, substantially as described.

2. In a dynamo-electric machine having a single circuit, a ring or hollow cylinder of iron or other magnetic material, wrapped or unwrapped, provided interiorly with a group of radially-converging magnets, forming a part of the cylinder, in combination with a group of armatures projecting radially from and forming part of a central rotating hub of iron or other material, substantially as described.

3. A dynamo-electric machine provided with a group of radially-converging stationary electro-magnets, and a group of armatures radially affixed to and projecting from a central hub, when so arranged that the current generated in all the armatures is conducted through the coils surrounding all the stationary electro-magnets, as and for the purposes set forth.

4. The commutator H H′, made in two parts, as described, placed upon the shaft C, the ring J, and nut K, all constructed substantially as and for the purposes set forth.

5. In a dynamo-electric machine provided with a group of armatures radially affixed to a revolving hub, the detachable top plates or caps E′ on the armatures, substantially as and for the purpose set forth.

6. The radially-projecting cores and plates E and E′, independently detachable, substantially as and for the purposes set forth.

In testimony that I claim the foregoing I have hereunto set my hand this 4th day of June, 1877.

EDWARD WESTON.

Witnesses:
FRANK GALT,
W. C. MCARTHUR.